(12) United States Patent
Ortais

(10) Patent No.: US 9,464,944 B2
(45) Date of Patent: Oct. 11, 2016

(54) TEMPERATURE RANGE COMPLIANCE INDICATOR

(71) Applicant: GEM INNOV, Gemenos (FR)

(72) Inventor: Yves Ortais, Gemenos (FR)

(73) Assignee: GEM INNOV, Gemenos (FR)

( * ) Notice: Subject to any disclaimer, the term of this patent is extended or adjusted under 35 U.S.C. 154(b) by 222 days.

(21) Appl. No.: 14/375,541

(22) PCT Filed: Jan. 25, 2013

(86) PCT No.: PCT/FR2013/050151
§ 371 (c)(1),
(2) Date: Sep. 30, 2014

(87) PCT Pub. No.: WO2013/114025
PCT Pub. Date: Aug. 8, 2013

(65) Prior Publication Data
US 2015/0047552 A1    Feb. 19, 2015

(30) Foreign Application Priority Data

Jan. 30, 2012 (FR) ..................... 12 50833

(51) Int. Cl.
*G01K 11/12* (2006.01)
*C09D 11/50* (2014.01)
*C09D 11/16* (2014.01)
(Continued)

(52) U.S. Cl.
CPC ............... *G01K 11/12* (2013.01); *C09D 5/26* (2013.01); *C09D 11/16* (2013.01); *C09D 11/50* (2013.01); *C09K 9/02* (2013.01)

(58) Field of Classification Search
CPC ........ B41M 5/20; C09D 11/00; G01K 11/06; G01K 11/12; G01K 11/125

USPC ........ 116/207, 216, 217, 218, 219; 374/106, 374/162
See application file for complete search history.

(56) References Cited

U.S. PATENT DOCUMENTS

| 4,452,995 | A | * | 6/1984 | Patel ..................... G01K 11/16 252/408.1 |
| 4,720,301 | A | * | 1/1988 | Kito ...................... B41M 5/305 106/31.17 |

(Continued)

FOREIGN PATENT DOCUMENTS

| FR | 2899684 A1 * | 10/2007 | ............. G01K 11/06 |
| GB | 2373338 A | 9/2002 | |

(Continued)

OTHER PUBLICATIONS

EP search report and written opinion dated May 22, 2013 for PCT/FR2013/050151.

*Primary Examiner* — R. A. Smith
(74) *Attorney, Agent, or Firm* — Jordan IP Law, LLC; Todd A. Vaughn

(57) ABSTRACT

An indicator or display that may be in the form of a label that can instantaneously provide confirmation that a product is in a good preservation state by making a simple visual check, and particularly to detect if the product temporarily went outside a determined temperature range and to memorize this event. Strict monitoring of a temperature range is essential to be able to guarantee quality of many products. The indicator or display may be applicable to any product or device for which the temperature has to be monitored between two thresholds.

20 Claims, 1 Drawing Sheet

(51) Int. Cl.
*C09D 5/26* (2006.01)
*C09K 9/02* (2006.01)

(56) References Cited

U.S. PATENT DOCUMENTS

| | | | | |
|---|---|---|---|---|
| 4,732,810 A | * | 3/1988 | Kito | G01K 11/16 106/31.17 |
| 6,494,950 B1 | * | 12/2002 | Fujita | B41M 5/305 106/499 |
| 7,708,913 B2 | * | 5/2010 | Fujita | B41M 5/305 252/583 |
| 7,794,631 B2 | * | 9/2010 | Fujita | B41M 5/305 252/582 |
| 8,173,052 B2 | * | 5/2012 | Fujita | B41M 5/305 15/424 |
| 2006/0166822 A1 | * | 7/2006 | Senga | B41M 5/284 503/201 |
| 2010/0012018 A1 | * | 1/2010 | Ribi | C09B 57/10 116/207 |

FOREIGN PATENT DOCUMENTS

| | | | | |
|---|---|---|---|---|
| JP | FR 2591534 A1 | * | 6/1987 | ............ B41M 5/305 |
| JP | 2004137614 A | | 5/2004 | |
| JP | 2004149726 A | | 5/2004 | |
| JP | EP 1477320 A2 | * | 11/2004 | ............ B41M 5/305 |
| WO | 2008/148964 A2 | | 12/2008 | |

\* cited by examiner

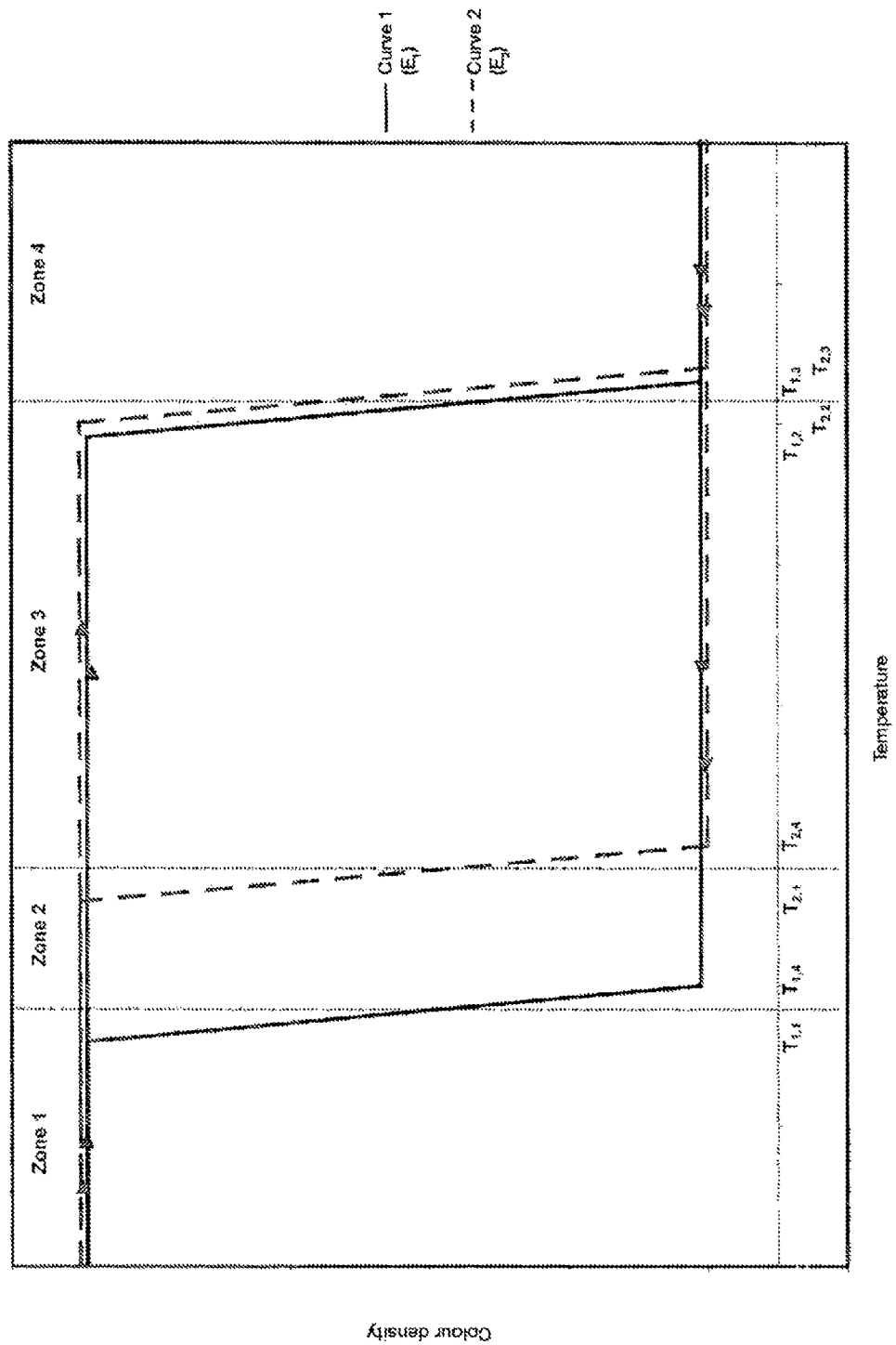

TEMPERATURE RANGE COMPLIANCE INDICATOR

CROSS-REFERENCE TO RELATED APPLICATIONS

The present application is a National Stage Application of PCT International Application No. PCT/FR2013/050151 (filed on Jan. 25, 2013), under 35 U.S.C. §371, which claims priority to French Patent Application No. A 12 50833 (filed on Jan. 30, 2012), which are each hereby incorporated by reference in their respective entireties.

TECHNICAL FIELD

This invention relates to an indicator or display that may be in the form of a label that can instantaneously provide confirmation that a product is in a good preservation state by making a simple visual check, and particularly to detect if the product temporarily went outside a determined temperature range and to memorize this event. Strict monitoring of a temperature range is essential to be able to guarantee quality of many products.

In general, the invention is applicable to any product or device for which the temperature has to be monitored between two thresholds.

BACKGROUND

Different types of systems are known that detect if a setpoint temperature is exceeded. In particular, there are indicators described in many documents reporting a failure of the cooling system or indicators showing that a product temperature has been too high.

French Patent Publication No. FR 2 899 684 discloses a product preservation status indicator to detect if the temperature of a product has exceeded a predetermined threshold called the setpoint temperature. This indicator comprises two transparent films hermetically assembled so as to trap two doses of liquid or viscous products, these doses being separated by a glue joint hermetically sealing adjacent faces of the two films. This glue is such that it loses its adhesive properties when a predetermined temperature is exceeded, so that if the setpoint temperature is reached after the indicator has been activated, then the viscous products will be free to mix and the result of this mix will be an irreversible change in the state such as a change in the color. Apart from the complexity of the system, this indicator cannot be used to make a visual check so as to immediately make sure that the state of preservation of the product has been good and maintained between two temperature thresholds. This indicator can only detect a crossing of a temperature threshold, but it is impossible to know if the product was too cold or too hot. Furthermore, the status change of the system is irreversible, and this is not a color memory system. Finally, irreversibility of the system makes it impossible to reuse the indicator once the temperature threshold has been exceeded.

European Patent Publication No. EP 1 410 368 discloses a fuel tank provided with a safety label located on the outside face of a tank, said label containing at least one reversible thermochromic material. This label changes color above a temperature threshold to inform the user about a possible burn on the skin if he does not have any protection. The label simply detects that the temperature has been exceeded (overheating). Therefore this label cannot be used as an indicator for a low temperature crossing (frost), for example for products that must not be frozen under any circumstances.

Indicators according to the state of the art have disadvantages firstly due to their complexity, and secondly because they are limited to a single threshold, in that they can indicate crossing of a temperature only above the setpoint temperature (abnormal overheating) or below the setpoint temperature (frost).

Two temperature thresholds frequently have to be monitored to assure good preservation of a product; there are many products that are sensitive to both cold and heat. Existing indicator systems are not suitable for these products. For example, some pharmaceutical and medical preparations are sensitive to cold and to heat and must not go outside a specific temperature range even for an instant. For example, a blood pouch must be kept at between +8° C. and +32° C., a vaccine must be kept (for example) between +3° C. and +8° C., and even an instantaneous exceedance of either of these two limits may make the product unsuitable for its planned used.

Similarly, most technical dispersions or emulsions (such as paints) suffer irreversible transformations as soon as they go outside a specific temperature range. And finally, many food products in the case of dispersions, emulsions, solutions or other systems, do not resist frost or excessively high temperatures; this is the case for some dairy products and some drinks (wine, beer, spirits, etc.), knowing that these products are not always stored and transported in an isothermal environment.

Thus, the problem that this invention aims to solve is to disclose a simple and reliable system for precisely determining whether or not an object or a product has gone outside a determined temperature range and to memorize this event. It must be possible to manufacture this system so that it can react to different temperature thresholds. It must be inexpensive, resistant to the environment wherein it is used and it must not contaminate the product to which it is affixed.

SUMMARY

The purpose of this invention is an indicator system to monitor that a setpoint temperature range is respected, comprising a thermochromic product (E) such as an ink, paint, or a thermochromic plastic material (E) composed of at least two thermochromic compositions ($E_1$) and ($E_2$), each with a first and a second color state as a function of the temperature, the transition from said first color state to said second color state being reversible, characterized in that said thermochromic compositions ($E_1$, $E_2$) have a thermal hysteresis, such that when the temperature of said thermochromic compositions ($E_1$, $E_2$) is increased, the transition from said first color state to said second color state takes place at a different temperature threshold than the transition from said second color state to said first color state when said system is cooled. Thus, said thermochromic product (E) has several color states that depend not only on its temperature at a given moment, but also on the temperature history applied to it.

In one embodiment, said system has an adjustable thermal hysteresis. "Adjustable" means that thermal hysteresis is such that the response curve (color density/temperature curve) of one of the two thermochromic compositions, for example (E1), is envelope to the response curve of the second thermochromic composition (E2).

Advantageously, the thermochromic compositions (E1, E2) contained in said system are in micro-encapsulated form. This means that the entire chemistry of the mix can be maintained and the mix can be protected from the outside environment. More particularly, each of the thermochromic compositions (E1, E2) may be micro-encapsulated separately from the other; thus, the thermochromic product (E) comprises at least two different types of microcapsules, namely a first type for the thermochromic composition (E1) and a second type for the thermochromic composition (E2). As will be explained below, each thermochromic composition (E1, E2) has at least two components that will interact optically or visually.

In one particular embodiment, the indicator system is in the form of a support, particularly a flexible, semi-rigid or rigid support such as a plastic film, preferably transparent, whereon a thermochromic ink (E) was applied as a thermochromic product (E) composed of at least two thermochromic compositions (E1, E2). More particularly, after application of said thermochromic product (E), said support may be placed on a packaging or a product or batch of products (P).

In one particular embodiment, the indicator system is in the form of a support, particularly a flexible, semi-rigid or rigid support such as a plastic film, preferably transparent, wherein at least two thermochromic compositions (E1, E2) have been incorporated so as to form a thermochromic support (E) such as a thermochromic plastic film (E). More particularly, after application of said thermochromic compositions (E1, E2), said support may be placed on a packaging or a product.

According to another particular embodiment, the indicator system is in the form of a thermochromic label on a white, colored or transparent background, comprising a transparent, white or colored substrate whereon a thermochromic ink (E) has been applied as a thermochromic product (E) composed of at least two thermochromic compositions (E1, E2).

In another particular embodiment, the indicator system is characterized in that at least one of the color states of at least one of the thermochromic compositions (E1, E2) may be detected outside the visible spectrum, and in one variant of this embodiment only outside the visible spectrum. More particularly, at least one of the color states of at least one of the thermochromic compositions (E1, E2) may be detected in the ultraviolet and/or infrared range, and particularly the near ultraviolet range and/or the near infrared range.

In another particular embodiment, the indicator system comprises a thermochromic product (E) composed of more than two thermochromic compositions (E1, E2, . . . En).

The indicator system according to the invention may be used as a temperature range compliance indicator, particularly as a good preservation indicator for products sensitive to temperature. The indicator system according to the invention may be useful particularly as a good preservation indicator for pharmaceutical products (particularly blood pouches, injectable products, vaccines, pharmaceutical preparations, pharmaceutical emulsions, creams, gels), food products (particularly dairy products, alcoholic drinks, non-alcoholic drinks and particularly wines and spirits), industrial emulsions (particularly varnish, paint, concrete additives, cleaning products) and other products such as flowers and plants.

Another purpose of the invention is a method of using the indicator system according to the invention comprising at least two thermochromic compositions (E1, E2), in which method: (a) said indicator system according to the invention is provided, (b) said system is put into a required initial color state by heating it or cooling it to a temperature causing a color change of at least one of the thermochromic compositions (E1, E2), and (c) said system is affixed to a product or batch of products (P) to be monitored such that it is kept within a temperature range (Ta, Tb) between steps (b) and (c) such that there is no change in the color state of one of the thermochromic compositions (E1, E2) of said system. In particular, the indicator system is a thermochromic label.

In a particular embodiment of the usage method according to the invention, a transparent or translucent indicator system according to the invention is applied in step (c) of said method above a barcode of a product or a batch of products (P) to be monitored, and wherein said thermochromic compositions (E1, E2) are chosen such that: the barcode is legible within the temperature range (Ta, Tb); and the change in the color state caused by one and/or the other of the limits (Ta, Tb) being exceeded makes said barcode illegible.

In another particular embodiment of the usage method according to the invention, the following steps are carried out when the system indicates a change in the color state after having been affixed to said product or batch of products (P) to be monitored: (d) one or several of said products or batches of products (P) to be monitored is (are) analyzed and a decision is made about the state of preservation of said products or batches of products (P) to be monitored; and (e) if the preservation state is considered to be satisfactory, then the expert in the system puts the system back into its initial color state using an appropriate heat treatment.

Another purpose of the invention is a thermochromic ink (E) composed of at least two thermochromic compositions (E1) and (E2), each of said thermochromic compositions (E1, E2) being micro-encapsulated separately from the other, and each having a first and a second color state dependent on the temperature, the transition from said first to said second color state being reversible, characterized in that said thermochromic compositions (E1, E2) have an adjustable thermal hysteresis such that the response curve (color density/temperature curve) of one of the two thermochromic compositions (E1) is envelope to the response curve of the second thermochromic composition (E2), and such that when said thermochromic ink (E) is heated, the transition from said first color state to said second color state takes place at a different temperature threshold than the transition from said second color state to said first color state when said thermochromic ink is cooled (E).

A final purpose of the invention is a writing or drawing instrument, particularly a pen, a felt pen, a wax crayon or chalk, containing thermochromic ink (E) according to the invention.

DRAWINGS

FIG. 1 is a graph illustrating a color density/temperature curve for the thermochromic compositions (E1, E2) contained in a thermochromic ink (E).

DESCRIPTION

The indicator system according to the invention comprises a thermochromic product (E) such as an ink, paint or a thermochromic plastic material (E) composed of at least two thermochromic compositions, for example (E1) and (E2), each having binary color variations (for example colored state/uncolored state) depending on the temperature.

Thermochromy is the capability of some materials to change color depending on the temperature. Thermochromic compositions used may be known thermochromic compositions, for example, like those disclosed in FR 2 591 534 or EP 1 477 320. These compositions typically include: (A) at least one chromatic organic compound called a leuco dye (dye wherein molecules may be in one of two forms, one of the two being colorless), which is an electron donor, (B) an electron acceptor compound that may be chosen particularly from the group formed by phenolic compounds, metallic salts of phenolic compounds, aromatic carboxylic acids, aliphatic carboxylic acids, metal salts of carboxylic acids, acid phosphoric esters, metallic salts of acid phosphoric esters and derivatives of triazole, and (C) a solvent, as the reactional medium that controls the colored reactions between compounds (A) and (B); this is usually a polar solvent. Solvents may be alcohols, esters, amides or acids, particularly with a long aliphatic chain.

In these thermochromic compositions, components (A), (B) and (C) will act on the shading type, the color density and the coloration or discoloration temperature respectively. By combining these components, a variety of reversible thermochromic compositions can be obtained wherein the shading type, the color density, the discoloration temperature and the recording preservation temperature interval can be determined depending on the relative proportions of components in the composition.

In one preferred embodiment, the thermochromic compositions used in a thermochromic product (E) are in the micro-encapsulated form. The advantage of micro-encapsulation is that the chemical integrity of the composition of each thermochromic composition (for example (A)+(B)+(C)) can be maintained and it can be protected from the outside environment. Products necessary to make the micro-encapsulation must not react with the thermochromic composition. The size of micro-capsules depends on several factors such as the concentration and the type of product used for micro-encapsulation. For example, an epoxy or melamine resin may be used for interface polymerization.

Compounds of components (A), (B) and (C) are exemplified in the following, for illustrative purposes. Known compounds such as lactone violet crystal that is an organic electron donor compound can be used as component (A) of the invention. The electron acceptor compound of component (B) may be composed of a group of compounds that have an active proton, a group of pseudo-acid compounds (a group of compounds that are not acid but that cause a change in the color of component (A) by acting like an acid in the composition) and a group of compounds that have electron holes. Finally, the compound for solvent (C) may be a fatty acid ester, for example ethyl palmitate.

The solubilized mix comprising the above-mentioned compounds may form a thermochromic product (E) such as an ink, paint or a thermochromic plastic material with a micro-encapsulated color memory, by inserting the mix in micro-capsules.

In one advantageous embodiment, the average diameter of the micro-capsules is between 0.5 and 50 µm and preferably between 1 and 15 µm. When the micro-capsules are too large, their dispersion in a liquid phase leads to an unstable system. When the micro-capsules are too small, it is difficult to obtain a high density coloring clearly visible to the naked eye.

Examples of the method for a micro-encapsulation system include a known type of interface polymerization of an isocyanate system, in situ polymerization for example of a melamine system, an immersed coating dip, a phase separation starting from an aqueous solution, a phase separation starting from an organic solvent, cooling by dispersion in the molten state, coating in suspension in air and drying by atomization.

In one particular embodiment, the indicator system may be in the form of a thermochromic label with a transparent or translucent white background, comprising a substrate (for example polymer film or paper sheet), that may be transparent or white, whereon a thermochromic ink (E) has been applied as the thermochromic product (E) with at least two thermochromic compositions (E1, E2).

In another particular embodiment, the indicator system may be in the form of a thermochromic label with a colored background comprising a substrate with a colored background whereon a thermochromic ink (E) is applied as the thermochromic product with at least two thermochromic compositions (E1, E2).

In general, the system comprises a thermochromic product (E) composed of at least two thermochromic compositions, for example (E1) and (E2), preferably with thermal hysteresis, each of which is characterized by four critical temperatures $T_{i,j}$: a temperature called the "lower color transition start temperature for increasing temperature" $T_{1,2}$, $T_{2,2}$; a temperature called the "lower color transition end temperature for increasing temperature" $T_{1,3}$, $T_{2,3}$; a temperature called the "upper color transition start temperature for reducing temperature" $T_{1,4}$, $T_{2,4}$; and a temperature called the "upper color transition end temperature for reducing temperature" $T_{1,1}$, $T_{2,1}$.

Knowing that the abbreviations $T_{i,j}$ (where i=1 or 2, j=1, ..., 4) refer to the example in FIG. 1. $T_{1,j}$ represents a critical temperature for the thermochromic composition (E1), $T_{2,j}$ represents a critical temperature for the thermochromic composition (E2).

We will now describe a first embodiment of the invention for illustrative purposes, namely an indicator system in the form of a thermochromic label with a white or transparent background comprising a transparent or white substrate (for example a polymer film) whereon a thermochromic ink (E) has been applied as the thermochromic product (E) composed of two thermochromic compositions (E1, E2).

The hysteresis characteristic in a color density/temperature curve for the thermochromic compositions (E1, E2) contained in the thermochromic ink (E) is described below with reference to the graph shown in FIG. 1.

In FIG. 1, the color density is shown on the ordinate and the temperature is shown on the abscissa. The variation in the color density due to a change in the temperature varies along the arrows.

Curve 1 shows the variation in the density of the black color of the thermochromic composition (E1) as a function of the temperature. Curve 2 shows the variation in the density of the red color of the thermochromic composition (E2) as a function of the temperature.

In FIG. 1, $T_{1,1}$ is the upper color transition end temperature for reducing temperature of the thermochromic composition (E1); $T_{1,2}$ is the lower color transition start temperature for increasing temperature of the thermochromic composition (E1) ($T_{1,2}>T_{1,1}$);

$T_{1,3}$ is the lower color transition end temperature for increasing temperature of the thermochromic composition (E1) ($T_{1,3}>T_{1,2}$); $T_{1,4}$ is the upper color transition start temperature for reducing temperature of the thermochromic composition (E1) ($T_{1,4}<T_{1,3}$); $T_{2,1}$ is the upper color transition end temperature for reducing temperature of the thermochromic composition (E2) ($T_{2,1}>T_{1,1}$); $T_{2,2}$ is the lower color transition start temperature for increasing temperature of the thermochromic composition (E2) (T2,2>T2,1 and T1,2≈T2,2); T2,3 is the lower color transition end temperature for increasing temperature of the thermochromic composition (E2) (T2,3>T2,2 and T1,3≈T2,3); and T2,4 is the upper color transition start temperature for reducing temperature of the thermochromic composition (E2) (T1,4<T2,4<T2,3).

Zone 3 is the "ideal" temperature range for good preservation of the product or the batch of products (P) herein referred to as the "temperature range to be monitored" or the "setpoint temperature range". Zone 1 is a temperature range lower than the temperature range to be monitored of the product or the batch of products (P). Zone 2 is the indicator activation zone. The user activates the indicator by putting it into very precise temperature conditions: the conditions for the Zone 2 window. Zone 4 represents a temperature range above the temperature range to be monitored for the product or batch of products (P).

We will start by describing a first usage situation wherein a product or a batch of products (P) whereon the thermochromic label (indicator) has been affixed, is overheated. The overheating phenomenon of the product or batch of products (P) can be described in several steps.

Step 1: firstly, the user activates the indicator by bringing it to a temperature T such that T1,4<T<T2,4 (Zone 2) for which only the thermochromic composition (E2) is in its colored state (since the temperature is still too low for the thermochromic composition (E1) to be colored). The indicator is red.

Step 2: the temperature is increased such that T2,4<T<T1,2 (Zone 3), the thermochromic composition (E2) is still in its colored state, the thermochromic composition (E1) is still in its uncolored state. Therefore, the indicator is red, and the product or batch of products (P) is still within the temperature range to be monitored.

Step 3: the temperature is increased once again such that T1,2<T<T1,3 (Zone 3) and then the temperature is increased such that T>T1,3 (Zone 4). The thermochromic composition (E2) is discolored until discoloration is complete for T>T1,3. The indicator becomes white or transparent (depending on the case). This means that the product or the batch of products (P) has been overheated (i.e. the temperature has momentarily exceeded the predetermined setpoint temperature) and the indicator retains this fact in memory even if the temperature returns into the temperature range to be monitored.

Step 4: the temperature is lowered to T2,4<T<T1,3 (Zone 3); due to their hysteresis, neither of the two thermochromic compositions (E1, E2) is recolored; therefore the indicator is white or transparent (depending on the case), since the ink is invisible. This means that the product or the batch of products (P) has been overheated, and the indicator remembers this even if the temperature returned into the temperature range to be monitored.

We will now describe a second usage situation wherein the product or batch of products (P) has been overcooled.

Step 1: firstly, the user activates the indicator by bringing it to a temperature T such that T1,4<T<T2,4 (Zone 2) for which only the thermochromic composition (E2) is in its colored state (since the temperature is still too low for the thermochromic composition (E1) to be colored). The indicator is red.

Step 2: the temperature is reduced to temperature T such that T1,1<T<T1,4 (Zone 1), the thermochromic composition (E1) is colored in turn. Therefore, the indicator turns black while retaining its red shade. The appearance of the black color means that the product or batch of products (P) has been cooled to below the temperature range to be monitored.

Step 3: the temperature is increased to temperature T such that T2,4<T<T1,2 (T1,2≈T2,2 Zone 3). The temperature has returned to the "ideal" range, the two thermochromic compositions (E1, E2) are not discolored. The result is that the indicator remains black with a red shade (the organic color donor compound can be chosen to make this red shade visible or not to the naked eye and/or in the infrared and/or in the near infrared). Therefore the appearance of the black color provides information that the product or the batch of products (P) has been cooled below the critical temperature and that the indicator retains this fact in memory even if the temperature returns into the temperature range to be monitored.

Step 4: the temperature is increased to reach a temperature T such that T>T1,3 and T>T2,3 (T1,3=T2,3, Zone 4). The two thermochromic compositions (E1, E2) are discolored and the indicator becomes white or transparent (depending on the case). This means that the product or batch of products (P) has been overheated and the indicator stores this fact in memory, but this is not sufficient to know if the product or batch of products (P) has been overcooled or if it has been previously overheated.

Consequently, if an indicator is used for example for a vaccine: if the indicator (label) is completely white or transparent on delivery, then the product or batch of products (P) has been overheated, threatening the integrity of the vaccine and notifying a danger. The merchandise can be refused; and if the indicator (label) is black on delivery, then the product or batch of products (P) has been overcooled, threatening the integrity of the vaccine and notifying a danger. The merchandise can be refused.

We will now describe a second embodiment of the invention for illustration purposes, namely a thermochromic label (indicator) with a colored background comprising a substrate with a colored background onto which a thermochromic ink (E) has been applied as the thermochromic product (E) with two thermochromic compositions (E1, E2). This second embodiment is also described with reference to FIG. 1.

In the case of the second embodiment, FIG. 1 shows the variation of the color density relative to the temperature of a thermochromic ink system (E) comprising two thermochromic compositions (E1, E2), with different colors (e.g. (E1)=blue and (E2)=green). In this embodiment, the indicator has a colored background (e.g. yellow).

Curve 1 shows the variation in density of the blue color of the thermochromic composition (E1) as a function of the temperature. Curve 2 shows the variation in density of the green color of the thermochromic composition (E2) as a function of the temperature.

In FIG. 1, T1,1 is the upper color transition end temperature for reducing temperature of the thermochromic composition (E1); T1,2 is the lower color transition start temperature for increasing temperature of the thermochromic composition (E1) (T1,2>T1,1); T1,3 is the lower color transition end temperature for increasing temperature of the thermochromic composition (E1) (T1,3>T1,2); T1,4 is the upper color transition start temperature for reducing temperature of the thermochromic composition (E1) (T1,4<T1,3); T2,1 is the upper color transition end temperature for reducing temperature of the thermochromic composition (E2) (T2,1>T1,1); T2,2 is the lower color transition start temperature for increasing temperature of the thermochromic composition (E2) (T2,2>T2,1 and T1,2≈T2,2); T2,3 is the lower color transition end temperature for increasing temperature of the thermochromic composition (E2) (T2,3>T2,2 and T1,3≈T2,3); and T2,4 is the upper color transition start temperature for reducing temperature of the thermochromic composition (E2) (T1,4<T2,4<T2,3).

Zone 3 corresponds to the temperature range to be monitored. Zone 1 corresponds to a temperature range below the temperature range to be monitored. Zone 2 is the indicator activation zone. The user activates the indicator by putting it under very precise temperature conditions: the conditions shown in the window in Zone 2. Zone 4 corresponds to a temperature range above the temperature range to be monitored.

We will now describe a first usage situation wherein a product or batch of products (P) has been overheated. In this example, the indicator has a yellow background.

Step 1: firstly, the user activates the indicator by bringing it to a temperature T such that T1,4<T<T2,4 (Zone 2) for which only the thermochromic composition (E2) is in its colored state (since the temperature is still too low for the thermochromic composition (E1) to be colored). The indicator is therefore green on a yellow background.

Step 2: the temperature is increased such that T2,4<T<T1,2 (Zone 3), the thermochromic composition (E2) is still in its colored state, the thermochromic composition (E1) is still in its uncolored state. Therefore, the indicator is green on a yellow background, and the product or batch of products (P) is still within the setpoint temperature range.

Step 3: the temperature is increased once again such that T1,2<T<T1,3 (Zone 3) and then the temperature is increased such that T>T1,3 (Zone 4). The thermochromic composition (E2) is discolored until discoloration is complete for T>T1,3 (Zone 4) The indicator becomes yellow. This means that the product or the batch of products (P) has been overheated and the indicator retains this fact in memory even if the temperature has since returned into the temperature range to be monitored.

Step 4: the temperature is then lowered such that T2,4<T<T1,3 (Zone 3); due to their hysteresis, neither of the two thermochromic compositions (E1, E2) is recolored; therefore the indicator is yellow. This means that the product or the batch of products (P) has been overheated, and the indicator remembers this even if the temperature has since returned into the temperature range to be monitored.

We will now describe a second usage situation in which case the product or batch of products (P) has been overcooled. In this example, the indicator has a yellow background.

Step 1: firstly, the user activates the indicator by bringing it to a temperature T such that T1,4<T<T2,4 (Zone 2) for which only the thermochromic composition (E2) is in its colored state (since the temperature is still too low for the thermochromic composition (E1) to be colored in turn). The indicator is therefore green on a yellow background.

Step 2: the temperature is reduced to a temperature T such that T1,1<T<T1,4 (Zone 1), the thermochromic composition (E1) is colored in turn. The indicator becomes Blue+Green on yellow background=Blue on yellow background. The appearance of the color blue means that the product or batch of products (P) has been cooled below the setpoint temperature range.

Step 3: the temperature is increased such that T2,4<T<T1,2 (T1,2≈T2,2, Zone 3). The temperature has returned inside the set range, the two thermochromic compositions (E1, E2) are not discolored. The result is that the indicator is Blue+Green on yellow background=Blue on yellow background. The appearance of the color blue means that the product or batch of products (P) has been cooled below the critical temperature and the indicator retains this fact in memory even if the temperature has since returned inside the setpoint temperature range.

Step 4: the temperature is then increased to a temperature T such that T>T1,3 and T>T2,3 (T1,3≈T2,3, Zone 4). The two thermochromic compositions (E1, E2) are discolored and the indicator becomes yellow (background color). The yellow means that the product or the batch of products (P) has been overheated, and the indicator remembers this, although it is impossible to know if the product or batch of products (P) had previously been overcooled or had previously been overheated.

Consequently, if the indicator is used for example for a vaccine: if the indicator has become yellow on delivery, then the product or batch of products (P) has been overheated, threatening the integrity of the vaccine and notifying a danger. The merchandise can be refused. If the indicator (label) has become blue, then the product or batch of products (P) has been overcooled, threatening the integrity of the vaccine and notifying a danger. The merchandise can be refused.

The state of the thermochromic label (indicator) according to the invention can be reset (i.e. the label can be returned to its initial state) by an appropriate heat treatment. The "initial state" according to the invention means the state of the indicator system (label) when it is placed under zone 2 temperature conditions (see FIG. 1), i.e. the activation zone of said system. For example, in the first usage situation described above (i.e. a product or batch of products (P) has been overheated), the label can be returned to its initial state by cooling to a temperature between T1,4 and T2,4. In practice, this can be useful when a batch of products (for example a batch of food products) has exceeded the upper setpoint temperature for a short period (for example T1,3), but after analysis of the product (for example by a microbiological and/or taste analysis), it is concluded that said product has not been damaged as a result of this brief passage at an excessive temperature. Therefore this possibility of "resetting" the label eliminates the need to destroy products that can still be sold, while notifying the stock manager about the temperature difference applied to the product. In many cases, a very short period outside the setpoint temperature range will not significantly deteriorate the product (P), knowing also that this temperature will firstly affect the packaging of the product (P) to which the label according to the invention is affixed, and will then propagate inside the product (P): the label according to the invention usually reacts to the effect of temperature more quickly than the product (P) for which it is monitoring good preservation inside the temperature range to be monitored.

The indicator is reset to zero by putting it under Zone 2 temperature conditions (FIG. 1). The narrower the Zone 2 temperature interval, the more difficult it will be to make the reset. The advantage of such a narrow interval is that resetting requires precision and considerable skill and therefore it is very difficult for someone who is not familiar with the system to reset it.

The indicator system according to the invention may be made in the form of a thermochromic label, preferably self-adhesive, that can easily be affixed onto the product (P) or packaging of said product (P). The label advantageously comprises a substrate whereon a thermochromic ink (E) is applied as the thermochromic product; this application may be done by any known inking technique, for example ink jet. Optionally, this thermochromic ink (E) may be protected by a transparent film. Said substrate may be a usual type of polymer film (for example PP, PE, PVC, PET) or a sheet of paper, both cases being transparent, translucent, opaque, colored or not colored. Said substrate may also be a metal sheet, or a sheet of metallized polymer or any other appropriate substrate.

The invention may also be made in the form of a flexible, semi-rigid or rigid support, preferably transparent or translucent, for example a thermochromic plastic film (E) as the thermochromic product (E) wherein at least two thermochromic compositions (E1, E2) have been incorporated in said plastic film. This incorporation may be done during fabrication of said support, for example by a method wherein a plastic raw material is provided (for example pellets or a powder), with at least two thermochromic compositions (E1, E2) according to the invention, or said thermochromic compositions (E1, E2) can be incorporated in said raw material, preferably in the form of a powder, and said support is formed for example in the form of a flexible, semi-rigid or rigid sheet or plate, that can then be cut to the required dimensions. Said support may be flexible, semi-rigid or rigid. The result obtained is a particularly resistant indicator system, possibly reusable, for example in the form of a label or a wafer; this system, label or wafer may be coated with an adhesive glue on one side so that it can be affixed onto a product or packaging.

The thermochromic product (E) according to the invention may be in the form of a thermochromic ink (E) that can be used in a writing or drawing instrument, for example a pen, a ball point pen, a fountain pen, a felt pen, a wax crayon or chalk. Felt pens, ball point pens or fountain pens can use thermochromic ink (E) according to the invention directly in liquid form. A piece of chalk is fabricated by impregnating an appropriate colored mineral powder (typically white) with thermochromic ink (E) according to the invention, and an appropriate shaped block of chalk can then be formed by compression. A wax crayon can be made by incorporating thermochromic ink (E) according to the invention into an appropriate wax, preferably a colorless wax, and an appropriate shaped crayon is formed. These writing or drawing instruments may have many industrial, commercial and games applications.

Example

An example synthesis of a thermochromic product (E) composed of at least two thermochromic compositions (E1, E2) for the indicator system according to the invention is presented below, but the invention is not limited to this example. All the percentages characterizing a composition are given as percentages by mass.

a) Preparation of the Thermochromic Product (E1)

Step 1: 2 g of sodium alginate and 0.7 g of Uramine P-1500 are dispersed in a solution A of 100 grams of water.

Step 2: a solution B containing 5% of Pergascript Green® (CIBA) (CAS No. 34372-72-0), 10% of Bisphenol-A, 10% of Ethyl palmitate and 73% of glycerol trilaurate are solubilized by heating to 100° C.

Step 3: solution B is poured into solution A while stirring (5 550 rev/min) for two minutes, and then 25 grams of a 25% solution of melamine formaldehyde in 75% water are poured slowly. The resulting emulsion is transferred while stirring slowly at 700 rev/min and is held in a warming bath for 8 hours.

After the suspension of micro-capsules has cooled, a discoloration temperature of 29° C. and a green re-coloration temperature of 7° C. are measured.

b) Preparation of the Thermochromic Product (E2)

Step 1: 2% of sodium alginate and 0.7% of Uramine P-1500 are dispersed in a solution A of 100 grams of water.

Step 2: a solution B containing 2.3% of Pergascript Blue® (BASF) (CAS No. 1552-42-7), 10.25% of Bisphenol-A, 8.25% of Ethyl palmitate and 79% of Glycerol trilaurate.

Step 3: solution B is poured into solution A while stirring (5 550 rev/min) for two minutes, and then 25 grams of a 25% solution of melamine formaldehyde and 75% water are poured slowly. The resulting emulsion is transferred while stirring slowly at 700 rev/min and is held in a warming bath for 8 hours.

After the suspension of micro-capsules has cooled, a discoloration temperature of 32° C. and a blue re-coloration temperature of 6° C. are measured.

The indicator system may be in the form of a thermochromic label whereon a thermochromic ink (E) has been applied as the thermochromic product (E), said label being prepared as follows: 50 grams of type (E1) micro-capsules, 50 grams of type (E2) micro-capsules and 100 grams of silk screen printing resin are incorporated in an aqueous base. The thermochromic ink (E) thus obtained has been printed on a flexible, transparent or colored substrate to form a label.

What is claimed is:

1. An indicator system to monitor that a setpoint temperature range is maintained, the indicator system comprising:
a thermochromic material composed of at least two thermochromic compositions, each at least two thermochromic composition having a first color state and a second color state as a function of temperature, a transition from said first color state to said second color state being reversible, said thermochromic compositions having an adjustable thermal hysteresis, such that a response curve of one of the at least two thermochromic compositions is enveloped to the response curve of the second thermochromic composition, and such that when the temperature of said thermochromic compositions is increased, the transition from said first color state to said second color state takes place at a different temperature threshold than the transition from said second color state to said first color state when said system is cooled; and
a heat treatment to return said indicator system to its initial color state.

2. The indicator system of claim 1, wherein the at least two thermochromic compositions are in micro-encapsulated form.

3. The indicator system of claim 2, wherein each of the at least two thermochromic compositions is micro-encapsulated separately from the other.

4. The indicator system of claim 1, further comprising a support.

5. The indicator system of claim 4, wherein the support comprises a transparent plastic film upon which an ink composed of the at least two thermochromic compositions is applied.

6. The indicator system of claim 4, wherein the support comprises a transparent thermochromic plastic film which incorporates the at least two thermochromic compositions.

7. The indicator system of claim 1, further comprising a thermochromic substrate upon which an ink composed of the at least two thermochromic compositions is applied.

8. The indicator system of claim 7, wherein the thermochromic substrate comprises a transparent, white or colored substrate.

9. The indicator system of claim 1, wherein at least one of the color states of at least one of the at least two thermochromic compositions is to be detected outside a visible spectrum.

10. The indicator system of claim 1, wherein at least one of the color states of at least one of the at least two thermochromic compositions is to be detected only outside a visible spectrum.

11. The indicator system of claim 1, wherein the thermochromic material comprises one of an ink, a paint, and a thermochromic plastic.

12. The indicator system of claim 1, wherein the response curve comprises a color density/temperature curve.

13. A temperature range compliance indicator, comprising: a thermochromic material composed of thermochromic compositions, each thermochromic composition having a first color state and a second color state as a function of temperature, a transition from said first color state to said second color state being reversible, said thermochromic compositions having an adjustable thermal hysteresis, such that a response curve of one of the thermochromic compositions is enveloped to the response curve of another of the thermochromic compositions, and such that when the temperature of said thermochromic compositions is increased, the transition from said first color state to said second color state takes place at a different temperature threshold than the transition from said second color state to said first color state when said system is cooled; and
a heat treatment to return said temperature range compliance to its initial color state.

14. A method of monitoring a preservation state of at least one product, comprising:
providing an indicator system that includes a thermochromic material composed of at least two thermochromic compositions, each at least two thermochromic composition having a first color state and a second color state as a function of temperature, a transition from said first color state to said second color state being reversible, said thermochromic compositions having an adjustable thermal hysteresis, such that a response curve of one of the at least two thermochromic compositions is enveloped to the response curve of the second thermochromic composition, and such that when the temperature of said thermochromic compositions is increased, the transition from said first color state to said second color state takes place at a different temperature threshold than the transition from said second color state to said first color state when said system is cooled, and a heat treatment to return said indicator system to its initial color state;
placing said indicator system into an initial color state;
affixing said indicator system to the at least one product such that the at least one product is kept within a specific temperature range between the placing of the indicator system and the affixing of the indicator system such that no change occurs in the color state of one of the thermochromic compositions.

15. The method of claim 14, wherein placing said indicator system into the initial color state comprises heating the indicator system to a temperature causing a color change of at least one of the thermochromic compositions.

16. The method of claim 14, wherein placing said indicator system into the initial color state comprises cooling the indicator system to a temperature causing a color change of at least one of the thermochromic compositions.

17. The method of claim 14, wherein said at least one product comprises a barcode.

18. The method of claim 17, wherein the affixing of the indicator system comprises affixing the indicator system spatially above said barcode.

19. The method of claim 17, wherein said thermochromic compositions are chosen such that:
the barcode is legible within the specific temperature range;
the change in the color state caused by exceeding the specific temperature range causes said barcode to become illegible.

20. The method of claim 19, further comprising, when a change in the color state is indicated after affixing the indicator system:
analyzing at least one of the at least one product and determining the state of preservation of said at least one product;
placing the indicator system back into an initial color state if the preservation state is satisfactory.

* * * * *